United States Patent
Hosoya

(10) Patent No.: US 9,502,066 B2
(45) Date of Patent: Nov. 22, 2016

(54) FERROMAGNETIC HEXAGONAL FERRITE POWDER, METHOD OF MANUFACTURING THE SAME, AND MAGNETIC RECORDING MEDIUM

(71) Applicant: FUJIFILM CORPORATION, Minato-ku, Tokyo (JP)

(72) Inventor: Yoichi Hosoya, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 63 days.

(21) Appl. No.: 14/499,679

(22) Filed: Sep. 29, 2014

(65) Prior Publication Data

US 2015/0093600 A1 Apr. 2, 2015

(30) Foreign Application Priority Data

Sep. 30, 2013 (JP) ................................. 2013-204843
Sep. 29, 2014 (JP) ................................. 2014-198175

(51) Int. Cl.
| | | |
|---|---|---|
| H01F 1/10 | (2006.01) | |
| G11B 5/714 | (2006.01) | |
| G11B 5/712 | (2006.01) | |
| G11B 5/706 | (2006.01) | |
| C01G 49/00 | (2006.01) | |

(52) U.S. Cl.
CPC ....... G11B 5/70678 (2013.01); C01G 49/0036 (2013.01); *C01P 2004/10* (2013.01); *C01P 2004/20* (2013.01); *C01P 2004/30* (2013.01); *C01P 2004/54* (2013.01); *C01P 2004/64* (2013.01); *C01P 2006/12* (2013.01); *C01P 2006/42* (2013.01); *Y02P 20/544* (2015.11); *Y10T 428/2982* (2015.01)

(58) Field of Classification Search
CPC ........... G11B 5/70678; C01P 2006/42; C01G 49/0081
See application file for complete search history.

(56) References Cited

U.S. PATENT DOCUMENTS

| | | |
|---|---|---|
| 6,251,474 B1 | 6/2001 | Hong et al. |
| 2003/0077382 A1 | 4/2003 | Hong et al. |

FOREIGN PATENT DOCUMENTS

| | | |
|---|---|---|
| JP | 2008-162864 A | 7/2008 |
| JP | 2009-208969 A | 9/2009 |
| JP | 2010-100489 A | 5/2010 |
| JP | 2010-241639 A | 10/2010 |
| JP | 2012-128905 A | 7/2012 |

OTHER PUBLICATIONS

English translation of previously-disclosed Office Action dated Mar. 1, 2016 from the Japanese Patent Office issued in corresponding Japanese Application No. 2014-198175.

*Primary Examiner* — Carol M Koslow
(74) *Attorney, Agent, or Firm* — Sughrue Mion, PLLC

(57) ABSTRACT

An aspect of the present invention relates to ferromagnetic hexagonal ferrite powder, the average particle size of which is equal to or less than 20 nm, and which comprises, on a particle number basis, equal to or more than 50% of ellipsoid hexagonal ferrite powders satisfying relation (1): 1.2<major axis length/minor axis length<2.0 . . . (1).

9 Claims, 4 Drawing Sheets

FERROMAGNETIC HEXAGONAL FERRITE POWDER, METHOD OF MANUFACTURING THE SAME, AND MAGNETIC RECORDING MEDIUM

CROSS-REFERENCE TO RELATED APPLICATIONS

This application claims priority under 35 U.S.C 119 to Japanese Patent Application No. 2013-204843 filed on Sep. 30, 2013 and Japanese Patent Application No. 2014-198175 filed on Sep. 29, 2014. Each of the above applications is hereby expressly incorporated by reference, in its entirety.

BACKGROUND OF THE INVENTION

Field of the Invention

The present invention relates to ferromagnetic hexagonal ferrite powder.

The present invention also relates to a method of manufacturing the above ferromagnetic hexagonal ferrite powder by a continuous hydrothermal synthesis process, and to a magnetic recording medium comprising the above ferromagnetic hexagonal ferrite powder as the ferromagnetic powder in a magnetic layer.

Discussion of the Background

Conventionally, ferromagnetic metal powders have been primarily employed in the magnetic layers of magnetic recording media for high-density recording. Ferromagnetic metal powders are comprised primarily of iron and the shape of the particles is primarily acicular. In ferromagnetic metal powders, reduction of the powder size and heightened coercive force are sought for high-density recording. These powders have come to be employed in magnetic recording media of various applications.

Ever higher density recording has been demanded of magnetic recording media due to the increasing amount of information being recorded. However, limits to the ability to improve ferromagnetic metal powder to achieve ever higher density recording have begun to appear. By contrast, in ferromagnetic hexagonal ferrite powder, the coercive force can be high enough to permit use even in permanent magnetic materials, and magnetic anisotropy, which is the basis of coercive force, depends on crystalline structure, making it possible to maintain a high coercive force even in fine particles. Further, magnetic recording media in which ferromagnetic hexagonal ferrite powder is employed in a magnetic layer afford good high-density characteristics due to the vertical component. In this manner, ferromagnetic hexagonal ferrite powder is a type of ferromagnetic powder that is suited to achieving higher densities.

Various proposals have been made in recent years to further improve ferromagnetic hexagonal ferrite powder having the above good characteristics (for example, see US2003/0077382A1, U.S. Pat. No. 6,251,474, and Japanese Unexamined Patent Publication (KOKAI) No. 2010-241639, which are expressly incorporated herein by reference in their entirety).

SUMMARY OF THE INVENTION

In recent years, recording densities have rapidly increased in the field of magnetic recording. Improved electromagnetic characteristics would be essential to achieving this. Magnetic recording media, particularly high-density recording media such as backup tapes, are required to afford highly reliable use over extended periods. It is thus desirable for the magnetic layer not to undergo considerable shaving due to sliding against the head during recording and reproduction and to have a high degree of coating durability. From this perspective, high coating strength would be important in the magnetic layer.

As set forth above, magnetic recording media are required to afford both good electromagnetic characteristics and coating durability. However, it is difficult to achieve both of these with conventional ferromagnetic hexagonal ferrite powders, including with the ferromagnetic hexagonal ferrite powders described in the above publications.

An aspect of the present invention provides for a magnetic recording medium affording both good electromagnetic characteristics and coating durability.

Examples of US2003/0077382A1 and U.S. Pat. No. 6,251,474 describe obtaining spherical barium ferrite of 100 nm to several hundred nm in size. On the other hand, Japanese Unexamined Patent Publication (KOKAI) No. 2010-241639 describes hexagonal ferrite of hexagonal planar (tabular) shape.

By contrast, the present inventor conducted extensive research. As a result, he made the novel discovery, previously unknown, that it was possible to manufacture a magnetic recording medium having both good electromagnetic characteristics and coating durability by means of ferromagnetic hexagonal ferrite powder in which the principal particles constituting the powder were ellipsoid particles of small particle size.

In this regard, the present inventor has presumed that the fact that the orientation of the particles of ferromagnetic powder in the magnetic layer can be improved due to the principal particles of the ferromagnetic powder contained in the magnetic layer being ellipsoid particles and the fact that the particle size of the ferromagnetic powder is small contribute to enhancing the electromagnetic characteristics and coating strength of the magnetic layer.

The present invention was devised based on the above knowledge.

An aspect of the present invention relates to ferromagnetic hexagonal ferrite powder, the average particle size of which is equal to or less than 20 nm, and which comprises, on a particle number basis, equal to or more than 50% of ellipsoid hexagonal ferrite powders satisfying relation (1):

$$1.2 < \text{major axis length/minor axis length} < 2.0 \ldots \quad (1).$$

In an embodiment, the average particle size of the ferromagnetic hexagonal ferrite powder ranges from 5 nm to 20 nm.

In an embodiment, the ferromagnetic hexagonal ferrite powder comprises, on a particle number basis, equal to or less than 45% of spherical hexagonal ferrite particles satisfying relation (2):

$$\text{major axis length/minor axis length} \leq 1.2 \ldots \quad (2).$$

In an embodiment, the ferromagnetic hexagonal ferrite powder comprises, on a particle number basis, equal to or less than 5% of acicular hexagonal ferrite particles satisfying relation (3):

$$\text{major axis length/minor axis length} \geq 2.0 \ldots \quad (3).$$

In an embodiment, the ferromagnetic hexagonal ferrite powder is ferromagnetic barium ferrite powder.

The coprecipitation method, reverse micelle method, hydrothermal synthesis method, glass crystallization method, and the like are known as methods of manufacturing hexagonal ferrite. As the result of extensive research, the present inventor also discovered that in a continuous hydrothermal synthesis process of conducting a hydrothermal synthesis reaction while continuously feeding a reaction solution, it was possible to manufacture the above ferromagnetic hexagonal ferrite powder, which is difficult to obtain by conventional hexagonal ferrite manufacturing methods, by using an organic modifier and controlling the various reaction conditions.

That is, a further aspect of the present invention relates a method of manufacturing ferromagnetic hexagonal ferrite powder, which comprises:

mixing an iron salt and a divalent metal salt in a base-containing water-based solution to prepare a hexagonal ferrite precursor; and continuously feeding a water-based mixed flow containing an organic modifier and the hexagonal ferrite precursor that has been prepared to a reaction flow passage while heating to equal to or higher than 300° C. and applying a pressure of equal to or higher than 20 MPa to convert the hexagonal ferrite precursor to hexagonal ferrite particles, to provide the above ferromagnetic hexagonal ferrite powder.

In an embodiment, the water-based mixed flow that is continuously fed into a reaction flow passage is a water-based mixed flow that is obtained by:

mixing a water-based solution comprising the hexagonal ferrite precursor that has been prepared with a solution comprising an organic modifier and then adding the solution that has been obtained by the mixing to a liquid feed passage into which water that has been heated and pressurized is being continuously fed.

In an embodiment, the water-based mixed flow that is continuously fed into a reaction flow passage is a water-based mixed flow that is obtained by:

sequentially adding a water-based solution comprising the hexagonal ferrite precursor that has been prepared and a solution comprising an organic modifier to a liquid feed passage to which water that has been heated and pressurized is being continuously fed.

In an embodiment, the water-based solution comprising the hexagonal ferrite precursor is prepared by causing a liquid feed passage to which a solution comprising a divalent metal salt and an iron salt is being fed to converge with a liquid feed passage to which a base-containing water-based solution is being fed to mix the two solutions.

In an embodiment, the organic modifier is selected from the group consisting of carboxylic acids and salts of carboxylic acids.

In an embodiment, the base-containing water-based solution is a water-based solution comprising a base in a quantity such that a molar ratio of the base to a combined quantity of the iron salt and the divalent metal salt is equal to or less than 5.

A further aspect of the present invention relates to a magnetic recording medium, which comprises a magnetic layer comprising ferromagnetic powder and binder on a nonmagnetic support, wherein the ferromagnetic powder is the ferromagnetic hexagonal ferrite powder.

An aspect of the present invention can provide a magnetic recording medium having both good electromagnetic characteristics and coating durability.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the Fig., wherein.

DETAILED DESCRIPTION OF THE EMBODIMENTS

Figure 1:
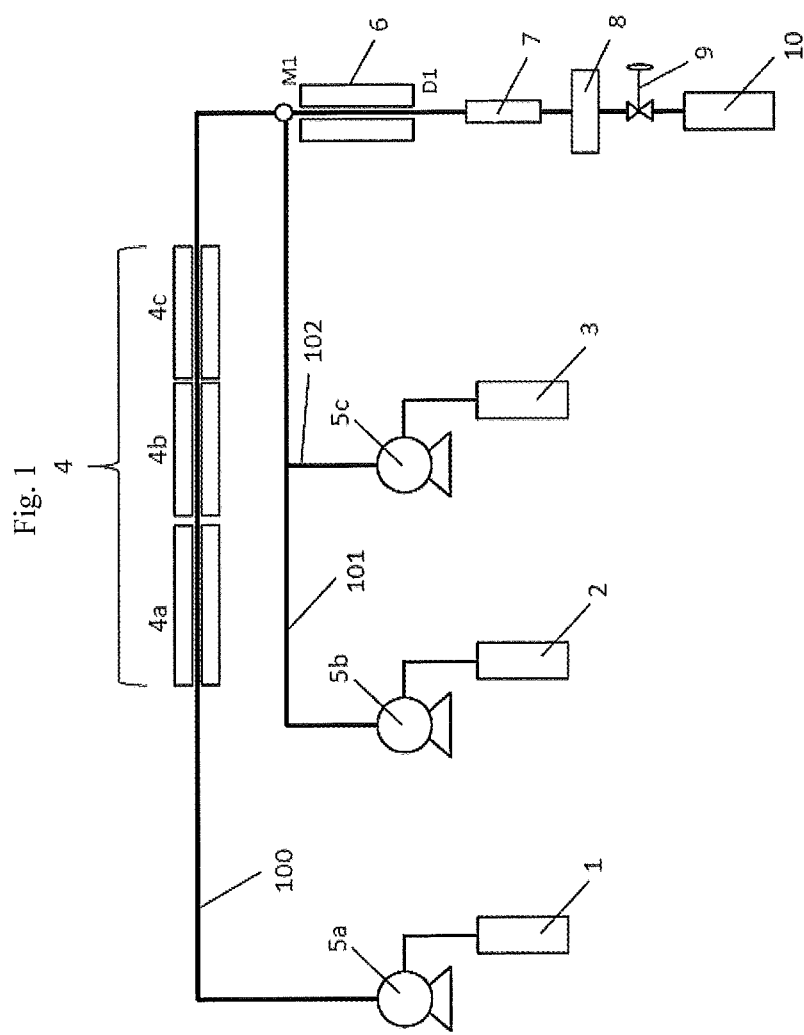
FIG. 1 is a schematic descriptive diagram of a manufacturing device used to manufacture ferromagnetic hexagonal ferrite powder based on a continuous hydrothermal synthesis process.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Ferromagnetic Hexagonal Ferrite Powder

The ferromagnetic hexagonal ferrite powder according to an aspect of the present invention has an average particle size of equal to or less than 20 nm and contains equal to or more than 50%, on a particle number basis, of ellipsoid hexagonal ferrite particles satisfying relation (1):

$$1.2 < \text{major axis length/minor axis length} < 2.0 \ldots \quad (1).$$

With the tabular hexagonal ferrite powder and ferromagnetic hexagonal ferrite powder containing primary particles in the form of spherical particles such as are described in US2003/0077382A1 and U.S. Pat. No. 6,251,474, it is difficult to achieve both electromagnetic characteristics and coating durability. By contrast, with the ferromagnetic hexagonal ferrite powder containing equal to or more than 50%, on a particle number basis, that is, as primary particles, of the above ellipsoid hexagonal ferrite particles, it is possible to manufacture a magnetic recording medium having good electromagnetic characteristics and a magnetic layer with good coating strength.

The above ferromagnetic hexagonal ferrite powder will be described in greater detail below.

The above ferromagnetic hexagonal ferrite powder has an average particle size of equal to or less than 20 nm. With ferromagnetic hexagonal ferrite powder having an average particle size exceeding 20 nm, it is difficult to achieve good electromagnetic characteristics. However, at an average particle size of equal to or less than 20 nm, the above ferromagnetic hexagonal ferrite powder can afford enhanced electromagnetic characteristics. Additionally, from the perspective of magnetization stability, the average particle size is desirably equal to or more than 5 nm, preferably equal to or more than 10 nm.

The above average particle size refers to the average major axis length as determined by the method of observation by a transmission electron microscope. Specifically, a photograph is taken of the particles by a direct method using a transmission electron microscope with an acceleration voltage of 100 kV (for example, a model H-9000 transmission electron microscope made by Hitachi), the major axis lengths of 500 of the particles are determined in the photograph, and the average value of the 500 particles is adopted as the average major axis length. The method of determining the major axis is described further below. More specifically, a photograph is taken of the particles at a magnification of 100,000-fold and printed on print paper at a total magnification of 500,000-fold. Target particles are selected from the particle photograph, the contours of the particles are traced with a digitizer, and Karl Zeiss image analysis software KS-400 is used to measure the size of the particles.

The ferromagnetic ferrite powder according to an aspect of the present invention, in addition to having an average particle size of equal to or less than 20 nm, contains equal to or more than 50% on a particle number basis of ellipsoid hexagonal ferrite particles satisfying relation (1):

$$1.2 < \text{major axis length/minor axis length} < 2.0 \ldots \quad (1).$$

The fact that the ellipsoid particles satisfying relation (1) can have good orientation properties in the magnetic layer has been presumed by the present inventor to contribute to enhancing the coating durability and electromagnetic characteristics of the magnetic recording medium having a magnetic layer containing ferromagnetic hexagonal ferrite powder in which the primary particles are the above ellipsoid particles.

In this context, the term "ellipsoid" as relates to the particles in the present invention is meant to mean not tabular. The term "tabular" means having a shape with a principal outer surface. The term "principal outer surface" means that the outer surface accounts for the greatest portion of the area of the particle. For example, in particles of hexagonal planar shape such as those described in Japanese Unexamined Patent Publication (KOKAI) No. 2010-241639, the surface accounting for the greatest portion of the area is the hexagonal outer surface; that portion is the principal surface. In the present invention, the term "ellipsoid" is meant to include irregular shapes. In an aspect of the present invention, the principal particles of the ferromagnetic hexagonal ferrite powder are the ellipsoid particles satisfying relation (1) because with particles that are contained as main particles that are in the form of tabular particles having a principal outer surface, even when the shape is such that the major axis length and the minor axis length satisfy relation (1), it is difficult to form a magnetic layer of high coating strength.

Further, the shape that is specified by relation (1) excludes spherical particles in which there is little difference between the major axis length and the minor axis length, and particles in which the major axis length is of a long, thin acicular shape relative to the minor axis length. Ferromagnetic hexagonal ferrite powder in which ellipsoid particles having such a shape account for a proportion of equal to or more than 50% makes it possible to provide a magnetic recording medium having both good electromagnetic characteristics and coating durability. The proportion accounted for by the ellipsoid particles satisfying relation (1) is desirably equal to or more than 55%, and can be 100%. Further, the proportion accounted for by the ellipsoid particles satisfying relation (1) can be equal to or less than 90% or equal to or less than 80%.

Additionally, to further enhance the orientation of the ferromagnetic powder in the magnetic layer, the ratio accounted for by spherical particles and acicular particles is desirably small. From this perspective, in the ferromagnetic hexagonal ferrite powder according to an aspect of the present invention, the proportion of spherical hexagonal ferrite particles satisfying relation (2) below:

$$\text{major axis length/minor axis length} \leq 1.2 \ldots \quad (2)$$

on a particle number basis is desirably equal to or less than 45%. For example, equal to or more than 10% and equal to or less than 45%, or equal to or more than 20% and equal to or less thann 45%, is desirable. Additionally, the proportion of acicular ferrite particles satisfying relation (3) below:

$$\text{major axis length/minor axis length} \geq 2.0 \ldots \quad (3)$$

on a particle number basis is desirably equal to or less than 5%.

The smaller the proportion of particles satisfying relations (2) and (3) above the better, with 0% being ideal.

In relations (1) to (3) above, the major axis length and minor axis length of 500 randomly extracted particles are measured, the ratio (major axis length/minor axis length) thereof is calculated, and ratio of the number of particles satisfying relations (1), (2), or (3) among the 500 particles to the total number of particles (500) is calculated. The major axis is determined by taking the axis (straight line) that yields the maximum length of the particle, and the length of the major axis is adopted as the major axis length. The minor axis is determined by taking the longest axis of the particle length as a straight line perpendicular to the major axis, and the length of this axis is adopted as the minor axis length. The major axis length and minor axis length are obtained by the method of observation by a transmission electron microscope described above for the method of measuring the average particle size.

The average particle size, major axis length, and minor axis length set forth above can be obtained by observing the ferromagnetic hexagonal ferrite powder that is present as powder by a transmission electron microscope. A measurement sample of the ferromagnetic hexagonal ferrite powder that is contained in the magnetic layer of a magnetic recording medium can be obtained by collecting powder from the magnetic layer. The measurement sample can be collected, for example, by the following method.

1. Subjecting the surface of the magnetic layer to 1 to 2 minutes of surface treatment with a plasma reactor made by Yamato Scientific Co., Ltd., and ashing the organic components (binder component and the like) of the surface of the magnetic layer to remove them.

2. Adhering filter paper that has been immersed in an organic solvent such as cyclohexanone or acetone to the edge portion of a metal rod, rubbing the surface of the magnetic layer that has been treated as in 1. above on it, and transferring the magnetic layer component from the magnetic tape to the filter paper to separate it.

3. Shaking off the component separated by 2. above in a solvent such as cyclohexanone or acetone (placing each piece of filter paper in solvent and using an ultrasonic disperser to shake it off), drying the solvent, and removing the separated component.

4. Placing the component that has been scraped off in 3. above in a glass test tube that has been thoroughly cleaned, adding n-butyl amine to about 20 mL of the magnetic layer component, and sealing the glass test tube. (The n-butyl amine is added in a quantity adequate to decompose the remaining binder that has not been ashed.)

5. The glass test tube is heated for equal to or more than 20 hours at 170° C. to decompose the binder and curing agent component.

6. The precipitate following the decomposition of 5. above is thoroughly washed with pure water and dried, and the powder is recovered.

7. A neodymium magnet is placed near the powder that has been collected in 6. and the powder that is attracted (that is, ferromagnetic hexagonal ferrite powder) is collected.

Ferromagnetic hexagonal ferrite powder can be collected from the magnetic layer by the above steps. Since the above processing can impart almost no damage to the particles, the above method permits measurement of the particle size of powder in the state in which it was contained in the magnetic layer.

Method of Manufacturing Ferromagnetic Hexagonal Ferrite Powder

The ferromagnetic hexagonal ferrite powder according to an aspect of the present invention described above is desirably manufactured by one of the hydrothermal synthesis processes proposed as methods of synthesizing nanoparticles in recent years. The term "hydrothermal synthesis process" is a technique of converting a hexagonal ferrite precursor into ferromagnetic hexagonal ferrite powder by heating a water-based solution containing the hexagonal ferrite precursor (also described as a "precursor solution", hereinafter). In this process, from the perspective of readily obtaining ferromagnetic hexagonal ferrite powder of small particle size, a continuous hydrothermal synthesis process of converting hexagonal ferrite precursor into ferrite by using the high reactivity of water that has been heated and pressurized (also described as "high-temperature, high-pressure water", hereinafter), desirably water that is in a subcritical to supercritical state, to heat and pressurize a water-based fluid containing the hexagonal ferrite precursor while feeding it into a reaction flow passage, is desirable.

The hexagonal ferrite precursor can be obtained by mixing an iron salt and a divalent metal salt in a base-containing water-based solution. Normally, a salt containing iron and the divalent metal will precipitate out of the base-containing water-based solution in particle form, desirably as colloidal particles. The particles that precipitate out here will convert to ferrite and become hexagonal ferrite magnetic particles when subsequently placed in the presence of water in a subcritical to supercritical state.

The "divalent metal" is a metal that can be rendered ionic in the form of a divalent cation. A divalent metal salt in the form of the salt of an alkaline earth metal such as barium, strontium, calcium, or lead, can be employed. The type of divalent metal can be determined based on the desired hexagonal ferrite. For example, when one wants to obtain barium ferrite, barium salt can be employed as the divalent metal salt, and when one wants to obtain strontium ferrite, a strontium salt can be employed. When one wants to obtain mixed crystals of barium ferrite and strontium ferrite, barium salt and strontium salt can be employed in combination as divalent metal salts. A water-soluble salt is desirable as the salt. For example, hydroxides; halides such as chlorides, bromides, and iodides; and nitrates can be used. The salt can also be in the form of a hydrate.

A water soluble salt of iron, such as a halide such as a chloride, bromide, or iodide; a nitrate; a sulfate; a carbonate; an organic acid salt; or a complex salt can be employed as the iron salt. The salt can also be in the form of a hydrate. It suffices to determine the mixing ratio of the iron salt and the divalent metal salt based on the desired ferrite composition. In addition to an iron salt and a divalent metal salt, a salt of any element capable of constituting hexagonal ferrite with iron and a divalent metal can be added. Examples of such optional elements are Nb, Co, Ti, and Zn. The quantity of the salt of an optional element that is added can be determined based on the desired ferrite composition.

The above-described salts can be mixed in a base-containing water-based solution to prepare a precursor (hexagonal ferrite precursor, also referred to simply as a "precursor") containing the elements that were contained in the salts. In an embodiment, the precursor precipitates out as particles, for example. The precursor that is prepared here is subsequently converted to ferrite, that is hexagonal ferrite.

In the present invention, the "base" refers to any one or more of the bases defined by Arrhenius, Bronsted, or Lewis (an Arrhenius base, Bronsted base, or Lewis base). Specific examples of bases are sodium hydroxide, potassium hydroxide, sodium carbonate, and ammonia water. However, there is no limitation to these compounds. Nor is there a limitation to an inorganic base; an organic base can also be employed. To increase the proportion of ellipsoid particles satisfying relation (1), the quantity of the base that is contained in the base-containing water-based solution, as a molar ratio to the combined quantity of iron salt and divalent metal salt, is desirably a quantity of equal to or more than 1 and preferably a quantity of equal to or more than 2. To inhibit the formation of tabular particles, the quantity employed is desirably a molar ratio of equal to or less than 5, preferably a molar ratio of equal to or less than 4.

The base-containing water-based solution is a solution that contains a base and contains a water-based solvent. The term "water-based solvent" refers to a solvent that contains water. This can be simply water, or a mixed solvent of water and an organic solvent. In the solvent in the base-containing water-based solution, water desirably accounts for equal to or more than 50 weight % of the total quantity of solvent, with water alone being preferred. An organic solvent that is employed in combination with water is desirably one that is miscible with water, or that is hydrophilic. From this perspective, the use of a polar solvent is suitable. This polar solvent will be described further below.

Next, the water-based solution containing the hexagonal ferrite precursor can be heated and pressurized. The water contained can be placed in a subcritical to supercritical state to induce the hexagonal ferrite precursor within the particle to react and convert to ferrite (undergo a ferrite transformation). As a result, it is possible to obtain hexagonal ferrite particles. In the present invention, the term "water-based" is used to mean containing water. In the water-based solution containing the hexagonal ferrite precursor, water desirably accounts for equal to or more than 50 weight % of the total quantity of solvent. The solvent can consist of just water, or can contain an organic solvent. Organic solvents that are contained are desirably either miscible with water or hydrophilic. From this perspective, the use of polar solvents is suitable. Polar solvents will be described further below.

Generally, a fluid containing water as a solvent can be heated to equal to or higher than 300° C. and pressurized to a pressure of equal to or higher than 20 MPa to place the water contained in the fluid in a subcritical to supercritical state. Generally, the water can be heated to equal to or higher than 200° C. and pressurized to equal to or higher than 20 MPa to place the water in a subcritical to supercritical state.

The following embodiment is a specific embodiment of the steps for converting hexagonal ferrite precursor into hexagonal ferrite.

(1) The water-based solution containing hexagonal ferrite precursor is continuously fed to a reaction flow passage that heats the fluid flowing through it to equal to or higher than 300° C. and applies a pressure of equal to or higher than 20 MPa to convert the hexagonal ferrite precursor to hexagonal ferrite in the reaction flow passage.

(2) The water-based solution containing hexagonal ferrite precursor is added to a liquid feed passage to which high-temperature, high-pressure water, desirably water that is heated to equal to or higher than 200° C. and pressurized to a pressure of equal to or higher than 20 MPa, is continuously fed. The mixed liquid of water and the water-based solution containing hexagonal ferrite precursor is continuously fed while being heated to equal to or higher than 300° C. and pressurized to a pressure of equal to or higher than 20 MPa to convert the hexagonal ferrite precursor to hexagonal ferrite.

Embodiment (2) differs from embodiment (1) in that high-temperature, high-pressure water and the water-based solution containing hexagonal ferrite precursor are contacted prior to the heating and pressurizing to put the water-based solution containing hexagonal ferrite precursor into a subcritical or supercritical state. In embodiment (2), contact with high-temperature, high-pressure water, desirably water in a subcritical to supercritical state, can rapidly put the hexagonal ferrite precursor in a highly reactive state, and is advantageous from the perspective of causing the transformation to ferrite to progress at an early stage.

Treating the hexagonal ferrite magnetic powder with an organic modifier can be an effective way of preventing aggregation between particles. In an embodiment, such an organic modifier can be added to the liquid feed passage to which the mixed liquid—obtained by mixing high-temperature, high-pressure water with the water-based solution containing hexagonal ferrite precursor—is being fed. Reference can be made, for example, to Japanese Unexamined Patent Publication (KOKAI) Nos. 2009-208969 and 2013-34952, which are expressly incorporated herein by reference in their entirety, for this embodiment.

In another embodiment, a water-based solution containing hexagonal ferrite precursor can be added to a liquid feed passage to which a mixed liquid obtained by mixing an organic modifier and high-temperature, high-pressure water is being fed.

Preferably, from the perspective of achieving even finer particles of ferromagnetic hexagonal ferrite powder, the water-based solution containing hexagonal ferrite precursor and organic modifier is subjected to embodiment (1) or embodiment (2), desirably the process of embodiment (2).

Since the organic modifier can thus adsorb to the hexagonal ferrite precursor prior to the ferrite transformation in the reaction flow passage, particle aggregation can be more effectively prevented and it is possible to readily obtain ferromagnetic hexagonal ferrite with an average particle size of equal to or less than 20 nm in an aspect of the present invention.

As set forth above, a manufacturing method that is suitable as a method of manufacturing the ferromagnetic hexagonal ferrite powder according to an aspect of the present invention is a method of manufacturing ferromagnetic hexagonal ferrite powder that yields the ferromagnetic hexagonal ferrite powder of an aspect of the present invention by:

mixing an iron salt and a divalent metal salt in a base-containing water-based solution to prepare a hexagonal ferrite precursor; and continuously feeding a water-based mixed flow containing an organic modifier and the hexagonal ferrite precursor that has been prepared to a reaction flow passage while heating to equal to or higher than 300° C. and applying a pressure of equal to or higher than 20 MPa to convert the hexagonal ferrite precursor to hexagonal ferrite particles.

In an embodiment, the water-based mixed flow that is continuously fed to the reaction flow passage can be obtained by mixing a water-based solution containing the hexagonal ferrite precursor that has been prepared with a solution containing an organic modifier, after which the solution that has been obtained by the above mixing is added to a liquid feed flow to which heated and pressurized water is being continuously fed.

This embodiment corresponds to embodiment A described further below. The details are set forth further below.

In an embodiment, the water-based mixed flow that is continuously fed to the reaction passage can be obtained by adding the water-based solution containing the hexagonal ferrite precursor that has been prepared and the solution containing an organic modifier sequentially to a liquid feed passage to which heated and pressurized water is being continuously fed.

This embodiment corresponds to embodiment B described further below. The details are set forth further below.

In yet another embodiment, the water-based solution containing hexagonal ferrite precursor is prepared by causing the liquid feed passage to which the solution containing an iron salt and a divalent metal salt is being fed to converge with a flow passage to which a base-containing water-based solution is being fed, thereby mixing the two solutions.

The details of this embodiment are set forth further below for an embodiment in which the hexagonal ferrite precursor is also prepared in a continuous manufacturing process.

The organic modifier can be, for example, an organic carboxylic acid, an organic nitrogen compound, an organic sulfur compound, an organic phosphorus compound, or a salt of any one of these. An alkali metal salt is suitable.

Examples of organic carboxylic acids are aliphatic carboxylic acids, alicyclic carboxylic acids, and aromatic carboxylic acids. Aliphatic carboxylic acids are desirable. The aliphatic carboxylic acid can be a saturated aliphatic carboxylic acid or an unsaturated aliphatic carboxylic acid. An unsaturated carboxylic acid is desirable. The number of carbon atoms in the carboxylic acid is not specifically limited. For example, it can be equal to or more than 2 but equal to or less than 24, desirably equal to or more than 5 but equal to or less than 20, and preferably, equal to or more than 8 but equal to or less than 16. Specific examples of aliphatic carboxylic acids are oleic acid, linoleic acid, linolenic acid, caprylic acid, capric acid, lauric acid, behenic acid, stearic acid, myristic acid, palmitic acid, myristoleic acid, palmitoleic acid, vaccenic acid, eicosenoic acid, propanoic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, octadecanoic acid, nonadecanoic acid, and icosanoic acid. However, there is no limitation to these compounds.

Examples of organic nitrogen compounds are organic amine and organic amide compounds, and nitrogen-containing heterocyclic compounds.

The organic amine can be a primary amine, secondary amine, or tertiary amine. Desirable examples are primary and secondary amines. Examples are aliphatic amines in the form of primary aliphatic amines and secondary aliphatic amines. The number of carbon atoms of the amine is not specifically limited. Examples are equal to or more than 5 but equal to or less than 24, desirably equal to or more than 8 but equal to or less than 20, and preferably equal to or more than 12 but equal to or less than 18. Specific examples of organic amines are oleylamine, laurylamine, myristylamine, palmitylamine, stearylamine, octylamine, decylamine, dodecylamine, tetradecylamine, hexadecylamine, octadecylamine, dioctylamine, and other alkylamines; aromatic amines such as anilines; amines containing hydroxyl groups such as methyl ethanol amines and diethanol amines; and derivatives thereof.

Examples of nitrogen-containing heterocyclic compounds are saturated or unsaturated heterocyclic compounds containing 1 to 4 nitrogen atoms and a three to seven-membered ring. Sulfur atoms, oxygen atoms, and the like can be contained as hetero atoms. Specific examples are pyridine, lutidine, chollidine, and quinolines.

Examples of organic sulfur compounds are organic sulfides, organic sulfoxides, and sulfur-containing heterocyclic compounds. Specific examples are dialkyl sulfides such as dibutyl sulfide; dialkyl sulfoxides such as dimethyl sulfoxide and dibutyl sulfoxide; and sulfur-containing heterocyclic compounds such as thiophene, thiorane, and thiomorpholine.

Examples of organic phosphorus compounds are phosphoric acid esters, phosphines, phosphine oxides, trialkyl phosphines, phosphorous acid esters, phosphonic acid esters, sub-phosphonic acid esters, phosphinic acid esters, and sub-phosphinic acid esters. Examples are tributyl phosphine, trihexyl phosphine, trioctyl phosphine, and other trialkyl phosphines; tributyl phosphine oxide, trihexyl phosphine oxide, trioctyl phosphine oxide (TOPO), tridecyl phosphine oxide, and other trialkyl phosphine oxides.

The organic modifier is desirably mixed in a quantity of about 1 to 1,000 weight parts per 100 weight parts of hexagonal ferrite precursor. The quantity of precursor serving as a basis here is the theoretically produced quantity based on measured values or the quantity of starting materials charged. It is thus possible to more effectively inhibit aggregation of particles. The organic modifier can be added to the solution with which it is to be mixed or to water as is. Adding it as a solution (organic modifier solution) containing the organic modifier in solvent is desirable for obtaining fine hexagonal ferrite magnetic particles. The solvent is desirably water, an organic solvent miscible with water, or a hydrophilic organic solvent. From this perspective, a polar solvent is suitably employed. In this context, the term "polar solvent" refers to a solvent that at a minimum has a dielectric constant of equal to or higher than 15 or a solubility parameter of equal to or higher than 8. Examples of desirable organic solvents are alcohols, ketones, aldehydes, nitriles, lactams, oximes, amides, ureas, amines, sulfides, sulfoxides, phosphoric acid esters, carboxylic acids, carboxylic acid derivatives in the form of esters, carbonic acid, carbonic acid esters, and ethers.

The organic modifier solution and the solution with which it is mixed, or water, can be mixed in batches or continuously. Continuous addition is desirable to enhance productivity through continuous operation with subsequent steps.

The following are examples of specific ways to mix the hexagonal ferrite precursor and the organic modifier.

Embodiment A

An embodiment in which a water-based solution containing the hexagonal ferrite precursor (also described as a "precursor solution", hereinafter) and the solution containing the organic modifier (also described as an "organic modifier solution", hereinafter) are mixed, after which the mixed solution obtained by mixing is introduced into a liquid feed passage to which high-temperature, high-pressure water is being fed.

Embodiment B

An embodiment in which a precursor solution and an organic modifier solution are sequentially introduced to a liquid feed passage to which high-temperature, high-pressure water is being fed.

Embodiments A and B also include embodiments in which the hexagonal ferrite precursor is prepared in a continuous manufacturing process.

The above embodiments will be described with reference to the figures. However, the present invention is not limited to the embodiments shown in the figures.

FIGS. 1 to 4 are schematic descriptive diagrams of manufacturing devices that can be used to manufacture ferromagnetic hexagonal ferrite powder by continuous hydrothermal synthesis processes.

Figure 2:
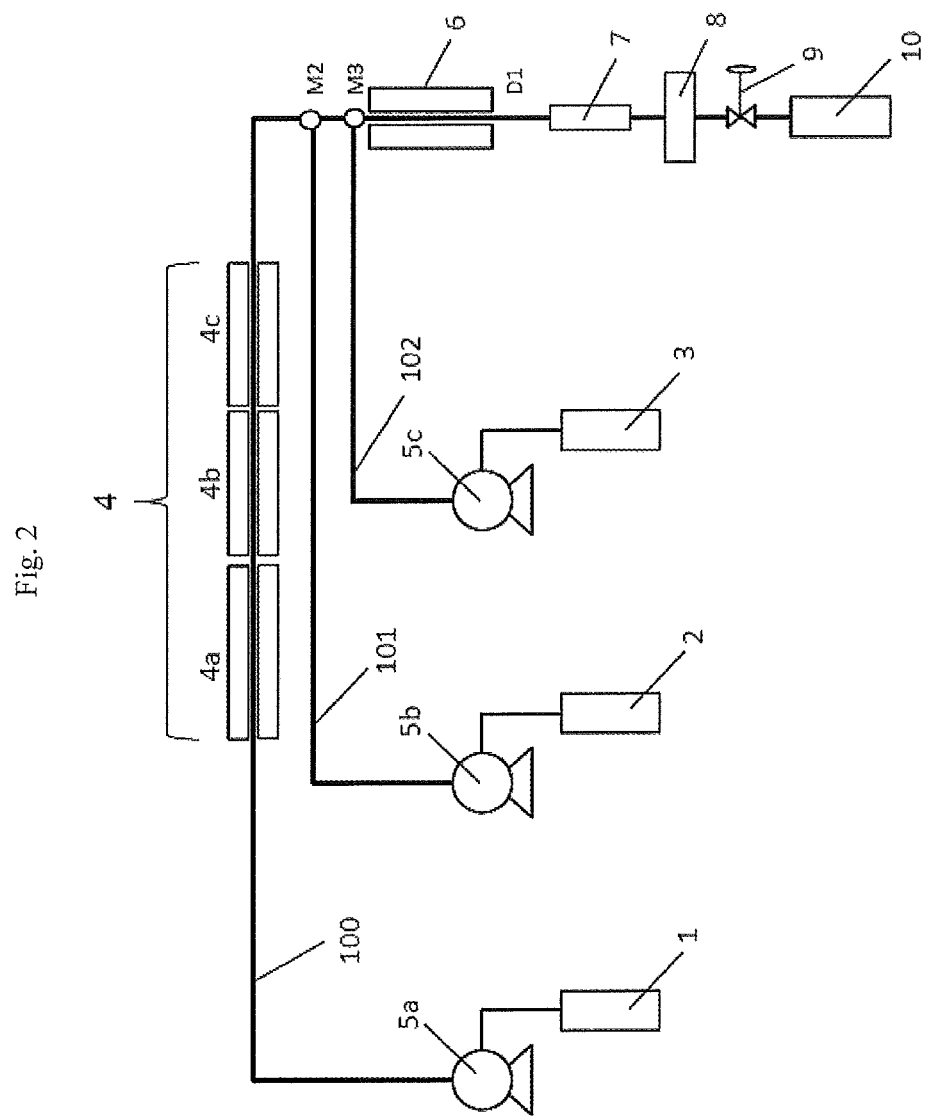
FIG. 2 is a schematic descriptive diagram of a manufacturing device used to manufacture ferromagnetic hexagonal ferrite powder based on a continuous hydrothermal synthesis process.

More specifically, FIG. 1 is a schematic descriptive diagram of an example of a manufacturing device that is suited to Embodiment A, and FIG. 2 is a schematic descriptive drawing of an example of a manufacturing device that is suited to Embodiment B.

Figure 3:
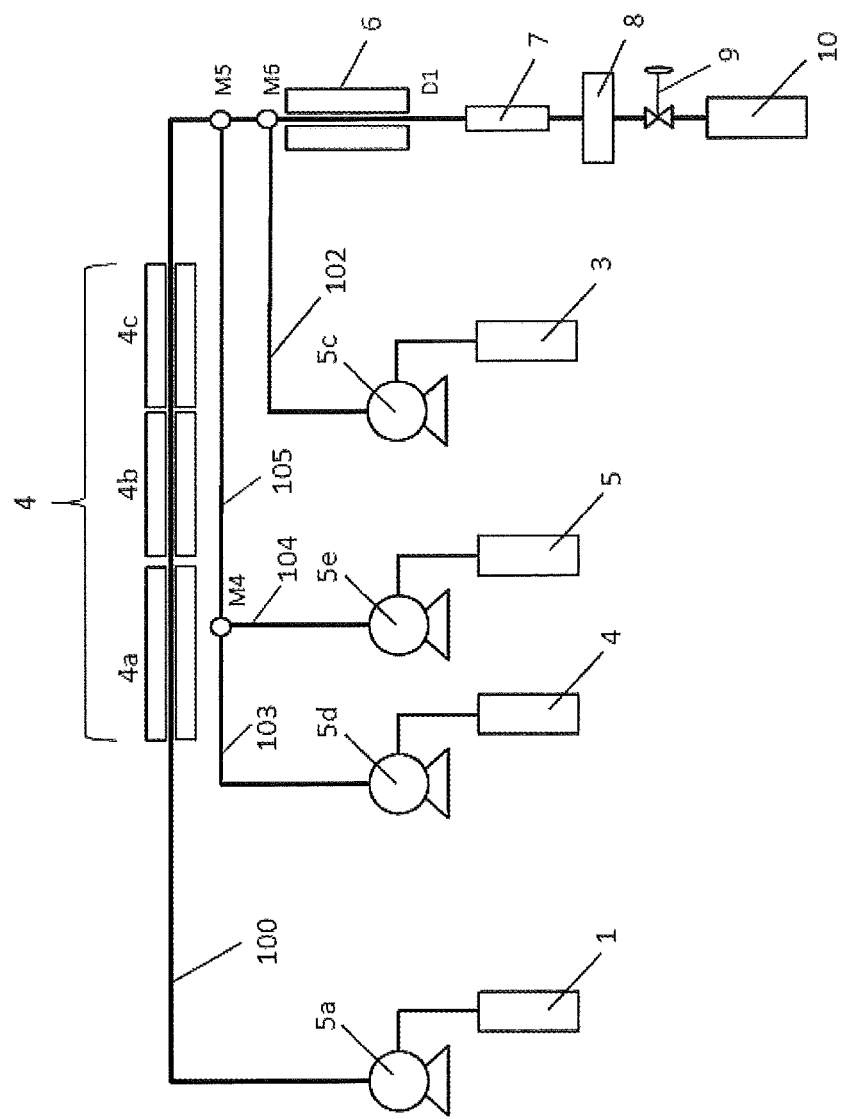
FIG. 3 is a schematic descriptive diagram of a manufacturing device used to manufacture ferromagnetic hexagonal ferrite powder based on a continuous hydrothermal synthesis process.
Figure 4:
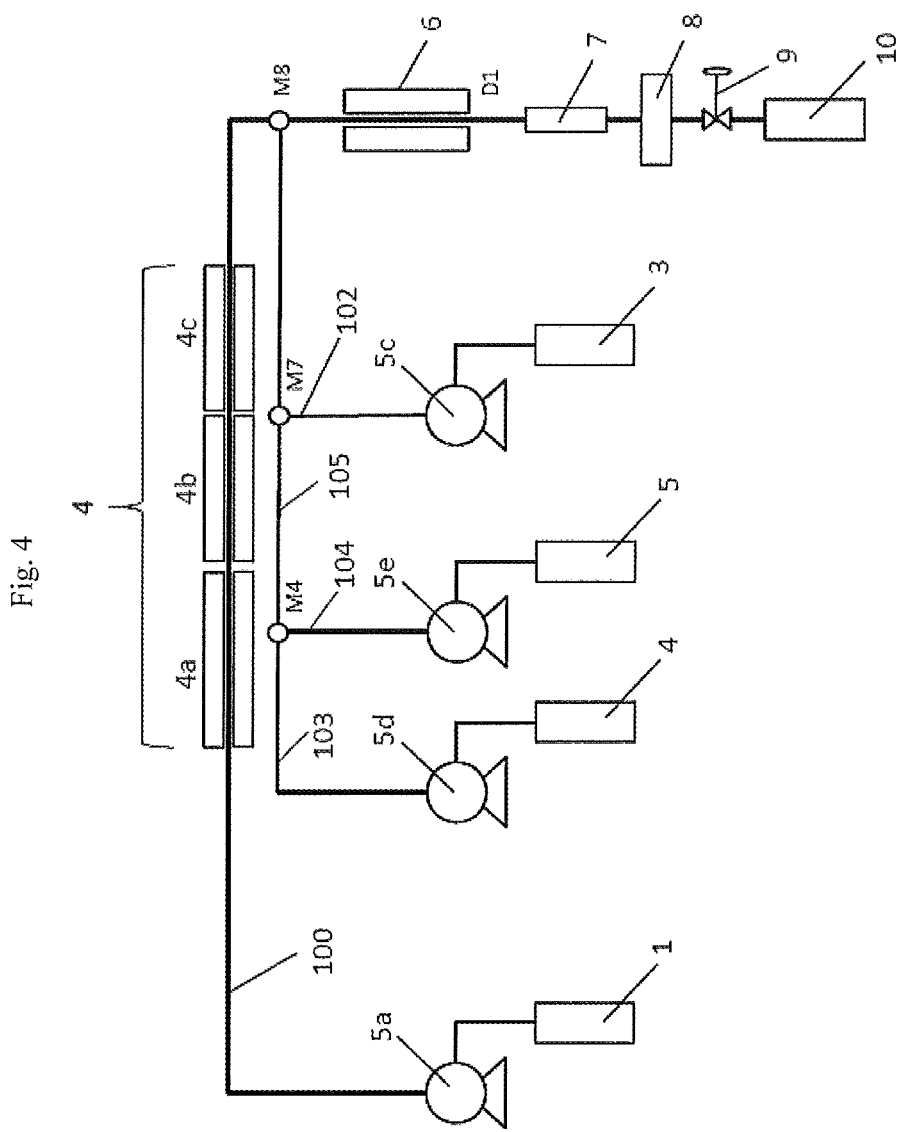
FIG. 4 is a schematic descriptive diagram of a manufacturing device used to manufacture ferromagnetic hexagonal ferrite powder based on a continuous hydrothermal synthesis process.

FIG. 3 is a schematic descriptive diagram of an example of a manufacturing device that is suited to Embodiment B in which hexagonal ferrite precursor is also prepared in a continuous manufacturing process. FIG. 4 is a schematic descriptive diagram of an example of a manufacturing device that is suited to Embodiment A in which hexagonal ferrite precursor is also prepared in a continuous manufacturing process.

In FIGS. 1 to 4, identical constituent elements are denoted by identical symbols.

The example of FIG. 1 will be described. The manufacturing device shown in FIG. 1 comprises liquid tanks 1, 2, and 3; heating means 4 (4a to 4c), pressurized liquid feeding means 5a, 5b, and 5c; a reaction flow passage 6; a cooling element 7; a filtering means 8; a pressure-regulating valve 9; and a recovery element 10. Fluids from the various tanks are fed through pipes 100, 101, and 102. In the figure., there are three heating means. This is simply an example; there is no limitation to this configuration.

In an embodiment, water such as pure water or distilled water is introduced into liquid tank 1, a water-based solution containing hexagonal ferrite precursor (precursor solution) is introduced into liquid tank 2, and an organic modifier solution is introduced into liquid tank 3. The water that has been introduced into liquid tank 1 is fed into pipe 100 while being pressurized by pressurized liquid feeding means 5a, and heated by heating means 4 to put the water in a subcritical to supercritical state, in which it arrives at mixing element M1.

The precursor solution that is fed from liquid tank 2 by pressurized liquid feeding means 5b through pipe 101 converges with the organic modifier solution that is fed from liquid tank 3 by pressurized liquid feeding means 5c through pipe 102, arriving in mixing element M1.

Desirably, prior to arriving in mixing element M1, organic modifier adsorbs to the surface of the hexagonal ferrite precursor. Adsorbing organic precursor to the hexagonal ferrite precursor prior to coming into contact with the water in a subcritical to supercritical state in this manner is advantageous for obtaining hexagonal ferrite of small particle size.

Next, in mixing element M1, the water-based solution containing hexagonal ferrite precursor comes into contact with high-temperature, high-pressure water, desirably water that is in a subcritical to supercritical state, causing the precursor to begin to transform into ferrite. Subsequently, heating is conducted in reaction flow passage 6 and pressure is applied to the interior of reaction flow passage 6 by pressurizing means 5a to put the water that is contained in the reaction system in reaction flow passage 6 in a subcritical to supercritical state, causing the ferrite transformation of the precursor to progress further. Subsequently, solution containing ferromagnetic hexagonal ferrite particles in which the hexagonal ferrite precursor has been converted to ferrite is discharged through discharge outlet D1. The solution that has been discharged is cooled by mixing it with cold water in cooling element 7, after which the hexagonal ferrite magnetic particles are collected by filtering means (a filter or the like) 8. The hexagonal ferrite magnetic particles that have been collected by filtering means 8 are discharged by filtering means 8, pass through pressure regulating valve 9, and are recovered by recovery element 10.

In the above method, since pressure is applied to the fluid that is fed to the interior, high-pressure metal pipe is desirably employed as the piping. Due to low corrosion, a stainless steel such as SUS316 or SUS304, or a nickel-based alloy such as Inconel (registered trademark in Japan) or Hastelloy (registered trademark in Japan), is desirably employed as the metal constituting the piping. However, there is no limitation to these materials, and an equivalent or similar material can also be employed. Piping of the laminate configuration described in Japanese Unexamined Patent Publication (KOKAI) No. 2010-104928, which is expressly incorporated herein by reference in its entirety, can also be employed.

In the manufacturing device shown in FIG. 1, the water in a subcritical to supercritical state and the water-based solution containing hexagonal ferrite precursor are mixed together in a mixing element M1 where the pipes are joined by a T-shaped joint. However, it is also possible to employ a reactor such as that employed in Japanese Unexamined Patent Publication (KOKAI) No. 2007-268503, 2008-12453, or 2010-75914, which are expressly incorporated herein by reference in their entirety. The reactor material is desirably that described in Japanese Unexamined Patent Publication (KOKAI) No. 2007-268503, 2008-12453, or 2010-75914. Specifically, the metal constituting the piping is desirably one of the above-described metals. However, it is not limited to them; an equivalent or similar material can be employed. Combination with a low-corrosion titanium alloy, tantalum alloy, ceramic, or the like is also possible.

The reaction system in which the water is present can be heated to equal to or higher than 300° C. and pressurized to equal to or higher than 20 MPa to put the water in a subcritical to supercritical state to create a reaction site of extremely high reactivity. Placing the hexagonal ferrite precursor in this state can cause the transformation to ferrite to advance rapidly, yielding ferromagnetic hexagonal ferrite particles.

A heating temperature of equal to or higher than 300° C. within the reaction system will suffice, with a temperature of equal to or higher than 350° C. being desirable. From the perspective of reducing the size of the hexagonal ferrite particles, the heating temperature is desirably equal to or lower than 500° C. within the reaction system, preferably equal to or lower than 450° C., and more preferably, equal to or lower than 400° C. The pressure that is applied in the reaction system is equal to or higher than 20 MPa as set forth above, desirably falling within a range of 20 to 50 MPa.

The manufacturing device shown in FIG. 2 is a manufacturing device that is suited to Embodiment B. In the manufacturing device shown in FIG. 2, the precursor solution is feed from liquid tank 2 by pressurized liquid feeding means 5b to flow passage 101, converging with liquid feed passage 100, through which high-temperature, high-pressure water is being fed, in mixing element M2. Subsequently, the mixed flow of high-temperature, high-pressure water and precursor solution converges in mixing element M3 with the organic modifier solution that has been fed to flow passage 102 by pressurized liquid feeding means 5c from liquid tank 3. As the reverse of the above example, it is also possible to introduce the organic modifier solution into liquid tank 2 and the precursor solution into liquid tank 3.

The details of the subsequent steps are identical to those described for the manufacturing device shown in FIG. 1 above.

The manufacturing device shown in FIG. 3 is a manufacturing device that is suited to Embodiment B where the hexagonal ferrite precursor is also prepared in a continuous manufacturing process. In the manufacturing device shown in FIG. 3, a solution containing iron salt and a divalent metal salt (also described as "starting material solution", hereinafter) is introduced into liquid tank 4 and a base-containing water-based solution (normally not containing an iron salt or a divalent metal salt) is introduced into liquid tank 5. The starting material solution that has been fed to pipe 103 by pressurized liquid feeding means 5d from liquid tank 4 converges with the base-containing water-based solution that has been fed to pipe 104 by pressurized liquid feeding means 5e from liquid tank 5 in mixing element M4. As the reverse of the above example, it is also possible to introduce the base-containing water-based solution into liquid tank 4 and the starting material solution into liquid tank 5.

The mixed flow thus obtained passes over flow passage 105, converging in mixing element M5 with high-temperature, high-pressure water that has been fed to flow passage 100 by pressurized liquid feeding means 5a from liquid tank 1 and has been heated by heating means 4. The mixed flow thus obtained converges in mixing element M6 with organic modifier solution that has been fed to flow passage 102 by pressurized liquid feeding means 5c from liquid tank 3.

Details of the subsequent steps are identical to those described for the manufacturing device shown in FIG. 1 above. The present embodiment is desirable from the perspective of the magnetic characteristics of the ferromagnetic hexagonal ferrite powder that is obtained.

The manufacturing device shown in FIG. 4 is a manufacturing device that is suited to a Embodiment A in which the hexagonal ferrite precursor is also prepared in a continuous manufacturing process. In the manufacturing device shown in FIG. 4, a solution (starting material solution) containing an iron salt and a divalent metal salt is introduced into liquid tank 4 and a base-containing solution (normally not containing iron salt or divalent metal salt) is introduced into liquid tank 5. The starting material solution that is fed to pipe 103 by pressurized liquid feeding means 5d from liquid tank 4 converges in mixing element M4 with the base-containing water-based solution that has been fed to pipe 104 by pressurized liquid feeding means 5e from liquid tank 5. As the reverse of this description, it is also possible for the base-containing water-based solution to be introduced into liquid tank 4 and the starting material solution to be introduced into liquid tank 5.

The mixed liquid thus obtained converges in mixing element M7 of flow passage 105 with the organic modifier solution that has been fed to pipe 102 by pressurized liquid feeding means 5c from liquid tank 3. The reaction forming the precursor can be conducted and the organic modifier can adsorb to the surface of the precursor in the flow passage between M4 and M8.

The mixed flow thus obtained converges in mixing element M8 with the high-temperature, high-pressure water that has been fed to flow passage 100 by pressurized liquid feeding means 5a from liquid tank 1 and that has been heated by heating means 4.

The details of the subsequent steps are identical to those described for the manufacturing device shown in FIG. 1 above.

The ferromagnetic hexagonal ferrite powder according to an aspect of the present invention is desirably obtained by the above manufacturing method. However, the ferromagnetic hexagonal ferrite powder according to an aspect of the present invention is not limited to being obtained by this manufacturing method.

Magnetic Recording Medium

An aspect of the present invention relates to a magnetic recording medium, which comprises a magnetic layer comprising ferromagnetic powder and binder on a nonmagnetic support, wherein the ferromagnetic powder is the above ferromagnetic hexagonal ferrite powder.

As set forth above, using the above ferromagnetic hexagonal ferrite powder as ferromagnetic powder in the magnetic layer can provide a magnetic recording medium having both good electromagnetic characteristics and coating durability.

The magnetic recording medium of an aspect of the present invention will be described in greater detail below.

Magnetic Layer

The details of the ferromagnetic hexagonal ferrite powder that is employed as ferromagnetic powder in the magnetic layer, and of the method of manufacturing it, are as set forth above.

The magnetic layer contains ferromagnetic powder and binder. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer described further below. Reference can be made to paragraphs 0029 to 0031 of Japanese Unexamined Patent Publication (KOKAI) No. 2010-24113, which is expressly incorporated herein by reference in its entirety, with regard to the above binders. Polyisocyanate curing agents can also be employed with the above resins.

Additives can be added as needed to the magnetic layer. Examples of additives are abrasives, lubricants, dispersing agents, dispersion adjuvants, antifungal agents, antistatic agents, oxidation inhibitors, solvents, and carbon black. The additives set forth above can be suitably selected for use from among commercial products based on the properties desired.

Nonmagnetic Layer

The contents of the nonmagnetic layer will be described in detail next. The magnetic recording medium of an aspect of the present invention can comprise a nonmagnetic layer containing nonmagnetic powder and binder between the nonmagnetic support and the magnetic layer. The nonmagnetic powder that is employed in the nonmagnetic layer can be an organic or an inorganic material. Carbon black and the like can also be employed. Examples of inorganic materials are metals, metal oxides, metal carbonates, metal sulfates, metal nitrides, metal carbides, and metal sulfides. Nonmagnetic powders of these materials are available as commercial products and can be manufactured by known methods. For details, reference can be made to Japanese Unexamined Patent Publication (KOKAI) No. 2010-24113, paragraphs 0036 to 0039.

The binders, lubricants, dispersing agents, additives, solvents, dispersion methods, and the like of the magnetic layer are also suitable for use for the nonmagnetic layer. Techniques that are known for magnetic layers can also be applied to the quantity and type of binder, the quantities and types of additives and dispersing agents added, and the like. Carbon black and organic material powders can also be added to the nonmagnetic layer. In this regard, by way of example, reference can be made to Japanese Unexamined Patent Publication (KOKAI) No. 2010-24113, paragraphs 0040 to 0042.

Nonmagnetic Support

Examples of nonmagnetic supports are known supports such as biaxially stretched polyethylene terephthalate, polyethylene naphthalate, polyamide, polyamide-imide, and aromatic polyamide. Among these, polyethylene terephthalate, polyethylene naphthalate, and polyamide are desirable.

These supports can be subjected in advance to corona discharge, plasma treatment, adhesion-enhancing treatment, heat treatment, or the like. The surface roughness of a nonmagnetic support that is suited to use in the present invention is desirably a centerline average roughness Ra of 3 nm to 10 nm at a cutoff value of 0.25 mm.

Layer Structure

In the thickness structure of the magnetic recording medium according to an aspect of the present invention, the thickness of the nonmagnetic support is desirably 3 µm to 80 µm. The thickness of the magnetic layer can be optimized based on the amount of saturation magnetization of the magnetic head employed, the length of the head gap, and the bandwidth of the recording signal. Generally, it can be 0.01 µm to 0.15 µm, desirably 0.02 µm to 0.12 µm, and preferably, 0.03 µm to 0.10 µm. It suffices for the magnetic layer to be comprised of a least one layer, but it can separated into two or more layers having different magnetic characteristics. The structures of known multilayer magnetic layers can be applied.

The thickness of the nonmagnetic layer is for example 0.1 µm to 3.0 µm, desirably 0.3 µm to 2.0 µm, and preferably 0.5 µm to 1.5 µm. The nonmagnetic layer of a magnetic recording medium according to an aspect of the present invention includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic desirably has no residual magnetic flux density or coercive force.

Backcoat Layer

A backcoat layer can be provided on the opposite surface of the nonmagnetic support from that on which the magnetic layer is present in the magnetic recording medium. The backcoat layer desirably comprises carbon black and inorganic powder. The formula of the magnetic layer and nonmagnetic layer can be applied to the binder and various additives used to form the backcoat layer. The thickness of the back coat layer is desirably equal to or less than 0.9 pm, preferably 0.1 µm to 0.7 µm.

Manufacturing Method

The process of manufacturing the coating liquid for forming the magnetic layer, nonmagnetic layer, or backcoat layer normally comprises at least a kneading step, dispersing step, and mixing steps provided as needed before and after these steps. The various steps can each be divided into two or more steps. All of the starting materials employed in the present invention, such as ferromagnetic powder, nonmagnetic powder, binder, carbon black, abrasives, antistatic agents, lubricants, and solvents, can be added either initially during the step or part way through. Any individual starting material can be divided for addition in two or more steps. For example, polyurethane can be divided up and added during a kneading step, dispersing step, or mixing step following dispersion to adjust the viscosity. In an aspect of the present invention, conventionally known manufacturing techniques can be employed for some of the steps. In the kneading step, it is desirable to employ an apparatus with powerful kneading strength in the kneading step, such as an open kneader, continuous kneader, pressurizing kneader, or extruder. Details on these kneading treatments are described in Japanese Unexamined Patent Publication (KOKAI) Heisei No. 1-106338 and Heisei No. 1-79274, which are expressly incorporated herein by reference in their entirety. Glass beads can also be used to disperse the magnetic layer coating liquid, nonmagnetic layer coating liquid, or backcoat layer coating liquid. High specific gravity dispersing beads in the form of zirconia beads, titania beads, and steel beads are also suitable. The particle diameter and packing rate of these dispersing beads can be optimized for use. A known dispersing apparatus can be employed. For details on methods of manufacturing magnetic recording media, reference can be made to Japanese Unexamined Patent Publication (KOKAI) No. 2010-24113, paragraphs 0051 to 0057, for example.

In the magnetic recording medium according to an aspect of the present invention that is set forth above, incorporating the above ferromagnetic hexagonal ferrite powder into the magnetic layer can yield good electromagnetic characteristics and coating durability. Thus, the above magnetic recording medium is suitable as a magnetic recording medium for use in high density recording that is required to permit recording and reproduction with high reliability over extended periods.

EXAMPLES

The present invention will be described in greater detail below through Examples. However, the present invention is not limited to the embodiments shown in Examples. The "parts" and "%" indicated below denote "weight parts" and "weight%," respectively. Unless specifically stated otherwise, the steps and evaluations set forth below were conducted in air at 23° C.±1° C. As needed, dispersions obtained by redispersion in toluene were employed in the evaluations.

In the X-ray diffraction analysis set forth below, CuKa radiation was scanned under conditions of 45kV and 40 mA and an XRD (X-ray diffraction) pattern was measured. The X-ray diffraction analysis spectra were measured under the following test conditions:
PANalytical X'Pert Pro diffractometer, PIXcel detectors
Voltage 45 kV, intensity 40 mA
Soller slits of incident beam and diffraction beam: 0.017 radians
Fixed angle of dispersion slit: ¼ degree
Mask: 10 mm
Scattering prevention slit: ¼ degree
Measurement mode: continuous
Measurement time per stage: 3 seconds
Measurement rate: 0.017 degree per second
Measurement step: 0.05 degree In Examples and Comparative Examples, the thickness of each layer was the design thickness calculated from the manufacturing conditions. The weight average molecular weight of the polyurethane resin mentioned further below was measured under the following conditions:
GPC device: HLC-8120 (made by Tosoh)
Column: TSK gel Multipore HXL-M (made by Tosoh, 7.8 mmID (inner diameter)×30.0 cm)
Eluant: Tetrahydrofuran (THF)

1. Examples and Comparative Examples Relating to Ferromagnetic Hexagonal Ferrite Powder for use in Magnetic Recording Examples 1-1 to 1-4, Comparative Examples 1-1 to 1-4

(1) Preparation of Precursor Solution

Barium hydroxide ($Ba(OH)_2.8H_2O$), iron (III) nitrate ($Fe(NO_3)_3.9H_2O$), and KOH were dissolved in pure water to prepare an aqueous solution (sol) (precursor solution) containing hexagonal ferrite precursor. In this process, the quantity of KOH added, as a molar ratio of KOH to the combined total of barium salt and iron salt (barium hydroxide ($Ba(OH)_2.8H_2O$) and iron (III) nitrate ($Fe(NO_3)_3.9H_2O$)), and the base concentration in the precursor solution, were set to yield the values indicated in Table 1. The concentration of the precursor in the various precursor solutions prepared was 0.05 M, and the Ba/Fe molar ratio was 0.5.

(2) Preparation of Organic Modifier Solution

Sodium oleate was dissolved in pure water to prepare a modifier solution. The quantity of sodium oleate in the solution that was prepared is given in Table 1.

(3) Hexagonal Ferrite Synthesis Reaction

The aqueous solution (sol) prepared in (1) above was introduced into liquid tank 2 of the manufacturing device shown in FIG. 1 and the organic modifier solution prepared in (2) above was introduced into liquid tank 3. SUS316BA tube was employed as the piping in the manufacturing device.

High-temperature, high-pressure water was caused to flow through pipe 100 by heating with heater 4 while feeding with heating and pressurizing means 5a (high pressure pump) the pure water that had been introduced into liquid tank 1. In this process, the temperature and pressure were controlled so that the temperature of the high-temperature, high-pressure water in the liquid feed passage after passing by heating means 4c was 350° C. and the pressure was 30 MPa.

The precursor solution and the organic modifier solution were heated by heating and pressurizing means 5b and 5c (high-pressure pumps) and fed at a liquid temperature of 25° C. to pipes 101 and 102, respectively, in a ratio based on volume of precursor solution: organic modifier solution=50: 50, and the two solutions were mixed along the way. The mixed liquid obtained was mixed with high-temperature, high-pressure water in mixing element M1. Next, ferromagnetic hexagonal ferrite particles (barium ferrite nanoparticles) were synthesized by heating and pressurizing for 20 seconds at the temperature indicated in Table 1 and at 30 MPa in reaction flow passage 6.

Following the synthesis of barium ferrite nanoparticles, the liquid containing the barium ferrite nanoparticles was cooled with cooling water in cooling element 7 and the particles were collected.

The particles that had been collected were washed with ethanol and the barium ferrite nanoparticles were then separated by centrifugation.

Comparative Example 1-5

With the exception that no KOH was added during preparation of the precursor solution in (1) above and the quantity of sodium oleate indicated in Table 1 was added to the organic modifier solution in (2) above, the same process as in the above Examples and Comparative Examples was conducted.

Comparative Example 1-6

Particle synthesis was conducted by the method set forth below as a comparative example corresponding to the method of U.S. Pat. No. 6,251,474.

Water was added to 5 g of particles of iron oxide (hematite) with an average particle size of 15 nm. Once all the material had been wetted with the water, 0.2 mL of oleylamine and 0.2 mL of oleic acid were added and the mixture was mixed while being kneaded with a mortar. Subsequently, the mixture was transferred to a Teflon (registered trademark in Japan) flask and the kneaded product adhering to the mortar was transferred to the Teflon flask while being diluted with water. The solution obtained was separated by centrifugation, the supernatant was discarded, and the mixture was redispersed with 112 g of water. To 14.6 g of a 5% aqueous solution of barium nitrate was added 0.67 mL of 25% ammonia water the mixture was stirred, and the mixture was mixed with the redispersion. Subsequently, 53.4 g of a 5% aqueous solution of sodium carbonate was added and the mixture was stirred for a day and a night.

Particles in the form of barium carbonate adhered to the surface of iron oxide particles were thus obtained. The solution obtained was separated by centrifugation. The precipitate was recovered, dried, and lightly crushed in a mortar. The powder thus obtained was heat treated for 15 minutes at a heating temperature of 800° C. while feeding air at 1 L/min in an imaging furnace made by ULVAC-RIKO, Inc., yielding spherical barium ferrite particles. These particles were dispersed in toluene and evaluated.

Evaluation Methods

1. Observation of Particle Shape

The numbers of particles satisfying relations (1), (2), and (3) out of 500 particles randomly extracted from among the particles prepared in Examples and Comparative Examples were calculated by the method set forth above.

2. Measurement of Average Particle Size

The average particle size of the ferromagnetic hexagonal ferrite powders prepared in Examples and Comparative Examples were obtained by the method set forth above.

3. X-Ray Diffraction Analysis

The fact that the particles prepared in Examples and Comparative Examples were hexagonal ferrite was confirmed by X-ray diffraction analysis.

2. Examples and Comparative Examples relating to magnetic recording media (magnetic tapes)

Examples 2-1 to 2-4, Comparative Examples 2-1 to 2-6

(1) Formula of Magnetic Layer Coating Liquid (Magnetic Liquid)

| | |
|---|---|
| Ferromagnetic hexagonal ferrite powder (listed in Table 2): | 100 parts |
| SO$_3$Na group-containing polyurethane resin: | 14 parts |
| (weight average molecular weight: 70,000; SO$_3$Na groups: 0.4 meg/g) | |
| Cyclohexanone: | 150 parts |
| Methyl ethyl ketone: | 150 parts |

(Abrasive Liquid)

| | |
|---|---|
| Abrasive liquid A, alumina abrasive (average particle diameter: 100 nm): | 3 parts |
| Sulfonic acid group-containing polyurethane resin: | 0.3 part |
| (weight average molecular weight: 70,000; SO$_3$Na groups: 0.3 meq/g) | |
| Cyclohexanone: | 26.7 parts |
| Abrasive liquid B, diamond abrasive (average particle diameter: 100 nm): | 1 part |
| Sulfonic acid group-containing polyurethane resin: | 0.1 part |
| (weight average molecular weight: 70,000; SO$_3$Na groups: 0.3 meq/g) | |
| Cyclohexanone: | 26.7 parts |

(Silica Gel)

| | |
|---|---|
| Colloidal silica (average particle diameter 100 nm): | 0.2 part |
| Methyl ethyl ketone: | 1.4 parts |

(Other Components)

| | |
|---|---|
| Stearic acid: | 2 parts |
| Butyl stearate: | 6 parts |
| Polyisocyanate (Coronate made by Nippon Polyurethane Industry Co., Ltd.): | 2.5 parts |

(Finishing Solvents)

| | |
|---|---|
| Cyclohexanone: | 200 parts |
| Methyl ethyl ketone: | 200 parts |

(2) Formula of Nonmagnetic Layer Coating Liquid

| | |
|---|---|
| Nonmagnetic inorganic powder α-iron oxide: | 100 parts |
| Average major axis length: 10 nm | |
| Average acicular ratio: 1.9 | |
| BET specific surface area: 75 m²/g | |
| Carbon black: | 25 parts |
| Average particle diameter: 20 nm | |
| SO$_3$Na group-containing polyurethane resin: | 18 parts |
| (weight average molecular weight: 70,000; SO$_3$Na groups: 0.2 meq/g) | |
| Stearic acid: | 1 part |
| Cyclohexanone: | 300 parts |
| Methyl ethyl ketone: | 300 parts |

(3) Formula of Backcoat Layer Coating Liquid

| | |
|---|---|
| Nonmagnetic inorganic powder α-iron oxide: | 80 parts |
| Average major axis length: | 0.15 μm |
| Average acicular ratio: | 7 |
| BET specific surface area: | 52 m²/g |
| Carbon black: | 20 parts |
| Average particle diameter: | 20 nm |
| Vinyl chloride copolymer: | 13 parts |
| Sulfonic acid group-containing polyurethane resin: | 6 parts |
| Phenyl phosphonic acid: | 3 parts |
| Cyclohexanone: | 155 parts |
| Methyl ethyl ketone: | 155 parts |
| Stearic acid: | 3 parts |
| Butyl stearate: | 3 parts |
| Polyisocyanate: | 5 parts |
| Cyclohexanone: | 200 parts |

(3) Preparation of Magnetic Tape

The above magnetic liquid was dispersed for 24 hours using a batch-type vertical sand mill. Zirconia beads 0.5 mm in diameter were employed as dispersion beads. The abrasive liquid was dispersed for 24 hours in a batch-type ultrasound device (20 kHz, 300 W). These dispersions were mixed with the other components (silica sol, other components, and finishing solvents) and then processed for 30 minutes in a batch-type ultrasound device (20 kHz, 300 W). Filtration was conducted with a filter having an average pore diameter of 0.5 μm to prepare a magnetic layer coating liquid.

For the nonmagnetic layer coating liquid, the various components were dispersed for 24 hours using a batch-type vertical sand mill. Zirconia beads 0.1 mm in diameter were employed as the dispersion beads. The dispersion obtained was filtered with a filter having an average pore diameter of 0.5 μm to prepare a nonmagnetic layer coating liquid.

For the backcoat layer coating liquid, all the components other than the lubricants (stearic acid and butyl stearate), the polyisocyanate, and 200 parts of cyclohexanone were kneaded and diluted in an open kneader. A horizontal bead mill disperser was then used with 1 mmφ zirconia beads to conduct 12 passes of dispersion treatment, each pass consisting of a residence time of 2 minutes, at a bead packing rate of 80% and a rotor tip peripheral speed of 10 m/s. The remaining components were then added to the dispersion and the mixture was stirred with a dissolver. The dispersion obtained was filtered with a filter having an average pore diameter of 1 um to prepare a backcoat layer coating liquid.

Subsequently, the nonmagnetic layer coating liquid was coated and dried on a polyethylene naphthalate support 5 um in thickness (with a Young's modulus in the width direction of 8 GPa, a Young's modulus in the longitudinal direction of 6 GPa, and a centerline surface roughness (Ra value) of 1.5 nm as measured using a 20-fold objective lens on an optical 3D roughness meter) to achieve a dry thickness of 100 nm. Subsequently, the magnetic layer coating liquid was applied thereover in a quantity calculated to yield a dry thickness of 70 nm. While the magnetic layer coating liquid was still wet, a magnetic field with a magnetic intensity of 0.6 T was applied in a direction perpendicular to the coated surface in a perpendicular orientation treatment, after which the coating was dried. The backcoat layer coating liquid was then coated and dried to a thickness of 0.4 μm on the opposite surface of the support.

A calender comprised of just metal rolls was then used to conduct a surface smoothing treatment at a speed of 100 m/minute, a linear pressure of 300 kg/cm, and a temperature of 100° C. A heat treatment was then conducted for 36 hours in a dry environment at 70° C. Following heating, the product was slit to ½ inch width to obtain a magnetic tape.

Evaluation Methods

1. Evaluation of electromagnetic characteristic (signal-to-noise (SNR) ratio)

Magnetic signals were recorded in the longitudinal direction on each of the magnetic tapes that had been prepared and reproduced with MR (magnetoresistive) heads under the conditions indicated below. The reproduced signals were frequency analyzed with a spectrum analyzer made by Shibasoku and the ratio of the 300 kfci output to the integrated noise over a range of 0 to 600 kfci was adopted as the SNR.

(Recording and Reproduction Conditions)

Recording: Recording track width 5 μm

Recording gap 0.17 μm

Head saturation magnetic flux density Bs 1.8 T

Reproduction: Reproduction track width 0.4 μm

Distance between shields (sh-sh distance) 0.08 μm

Recording wavelength: 300 kfci

2. Evaluation of Coating Durability (Scratch Resistance (Alumina Scratch Resistance))

In an environment of a temperature of 23° C. and a relative humidity of 10%, an alumina ball 4 mm in diameter was repeatedly run 20 times with a load of 20 g over the surface of the magnetic layer of each of the magnetic tapes prepared. The surface of the magnetic layer of the tape was then observed by an optical microscope (magnification: 200-fold) and evaluated on the following scale:

A: No scratching visible on the surface of the sample within the field of view of the optical microscope B: Scratches were visible in 1 to not more than 5 spots on the surface of the sample within the field of view of the optical microscope C: Scratches were visible in from 6 to not more than 10 spots on the surface of the sample within the field of view of the optical microscope D: Scratches were visible in 11 to nor more than 50 spots on the surface of the sample within the field of view of the optical microscope E: Scratches were visible in more than 50 spots on the surface of the sample within the field of view of the optical microscope Summaries and evaluation results of the above Examples and Comparative Examples are given in Tables 1 and 2 below.

TABLE 1

Examples and Comparative Examples relating to ferromagnetic hexagonal ferrite powder

|  | Ex. 1-1 | Ex. 1-2 | Ex. 1-3 | Ex. 1-4 | Comp. Ex. 1-1 | Comp. Ex. 1-2 | Comp. Ex. 1-3 | Comp. Ex. 1-4 | Comp. Ex. 1-5 | Comp. Ex. 1-6 |
|---|---|---|---|---|---|---|---|---|---|---|
| Proportion of ellipsoid particles satisfying relation (1) | 63% | 71% | 58% | 58% | 40% | 33% | — | 64% | 25% | 10% |
| Proportion of spherical particles satisfying relation (2) | 35% | 28% | 42% | 41% | 60% | 67% | — | 35% | 27% | 90% |
| Proportion of acicular particles satisfying relation (3) | 2% | 1% | 0% | 1% | 0% | 0% | — | 1% | 48% | 0% |
| Average major axis length | 16 nm | 17 nm | 14 nm | 9 nm | 12 nm | 13 nm | — | 25 nm | 19 nm | 40 nm |
| Concentration of base in precursor solution | 0.15M | 0.20M | 0.10M | 0.15M | 0.05M | 0.03M | 0.30M | 0.20M | — (Base was added to organic modifier solution.) | — |
| Proportion of base relative to total of iron salt and divalent metal salt (molar ratio) | 3 | 4 | 2 | 3 | 1 | 0.6 | 6 | 4 | — | — |
| Heating temperature within reaction flow passage | 400° C. | 400° C. | 400° C. | 350° C. | 400° C. | 400° C. | 400° C. | 450° C. | 400° C. | — |
| Shape of particle accounting for 50% or more | Ellipsoid particles | Ellipsoid particles | Ellipsoid particles | Ellipsoid particles | Spherical particles | Spherical particles | Tabular particles (85%) | Ellipsoid particles | Ellipsoid particles | Spherical particles |

TABLE 2

Examples and Comparative Examples relating to magnetic tape

|  | Ex. 2-1 | Ex. 2-2 | Ex. 2-3 | Ex. 2-4 | Comp. Ex. 2-1 | Comp. Ex. 2-2 | Comp. Ex. 2-3 | Comp. Ex. 2-4 | Comp. Ex. 2-5 | Comp. Ex. 2-6 |
|---|---|---|---|---|---|---|---|---|---|---|
| Ferromagnetic powder | Ex. 1-1 | Ex. 1-2 | Ex. 1-3 | Ex. 1-4 | Comp. Ex. 1-1 | Comp. Ex. 1-2 | Comp. Ex. 1-3 | Comp. Ex. 1-4 | Comp. Ex. 1-5 | Comp. Ex. 1-6 |
| SNR (dB) | +0.6 | +0.8 | +0.7 | +0.5 | 0 | 0 | −0.5 | −0.3 | −0.3 | −0.8 |
| Coating durability | A | A | A | A | C | C | D | B | D | C |

3. Examples and Comparative Examples Relating to the Ferromagnetic Hexagonal Ferrite Powder for Magnetic Recording Examples 3-1 to 3-5 and Comparative Examples 3-1 to 3-3

(1) Preparation of Precursor Solution

Barium hydroxide (Ba(OH)$_2$.8H$_2$O), iron (III) nitrate (Fe(NO$_3$)$_3$.9H$_2$O), and KOH were dissolved in pure water to prepare a water-based solution (sol) (precursor solution) containing hexagonal ferrite precursor. In this process, the base concentration in the precursor solution and the quantity of KOH added, as a molar ratio of KOH to the combined total of barium salt (barium hydroxide (Ba(OH)$_2$.8H$_2$O) and iron (III) nitrate (Fe(NO$_3$)$_3$.9H$_2$O)) were set to yield the values indicated in Table 3. The concentration of the precursor in the various precursor solutions prepared was 0.05 M, and the Ba/Fe molar ratio was 0.5.

(2) Preparation of Organic Modifier Solution

Oleic acid was dissolved in ethanol to prepare a modifier solution. The concentration of oleic acid in the solution that was prepared is given in Table 3.

(3) Hexagonal Ferrite Synthesis Reaction

The water-based solution (sol) prepared in (1) above was introduced into liquid tank 2 of the manufacturing device shown in FIG. 2 and the organic modifier solution prepared in (2) above was introduced into liquid tank 3. SUS316BA tube was employed as the piping in the manufacturing device.

High-temperature, high-pressure water was caused to flow through pipe 100 by heating with heater 4 while feeding with heating and pressurizing means 5a (high pressure pump) the pure water that had been introduced into liquid tank 1. In this process, the temperature and pressure were controlled so that the temperature of the high-temperature, high-pressure water in the liquid feed passage after passing by heating means 4c was 350° C. and the pressure was 30 MPa.

The precursor solution and the organic modifier solution were heated by heating means 5b and 5c (high-pressure pumps) and fed at a liquid temperature of 25° C. to pipes 101 and 102, respectively, in a ratio based on volume of precursor solution : organic modifier solution=50:50. The precursor solution was mixed with the high-temperature, high-pressure water in mixing element M2. The mixed flow obtained was mixed with the organic modifier solution in mixing element M3. Next, hexagonal ferrite particles (barium ferrite nanoparticles) were synthesized by heating and pressurizing for 20 seconds at the temperature indicated in Table 3 and at 30 MPa in reaction flow passage 6.

Following the synthesis of barium ferrite nanoparticles, the liquid containing the barium ferrite nanoparticles was cooled with cold water in cooling element 7 and the particles were collected.

The particles that had been collected were washed with ethanol and the barium ferrite nanoparticles were then separated by centrifugation.

Examples 5-1 to 5-4, Comparative Examples 5-1 to 5-3

(1) Preparation of Starting Material Solution and Base-Containing Aqueous Solution Barium hydroxide ($Ba(OH)_2 \cdot 8H_2O$) and iron (III) nitrate ($Fe(NO_3)_3 \cdot 9H_2O$) were dissolved in pure water to prepare an aqueous solution (starting material solution) containing the above iron salt and barium salt. The combined concentration of the iron salt and barium salt in the starting material solution that was prepared was 0.075 M, and the Ba/Fe molar ratio was 0.5.

KOH was added to and dissolved in water to prepare a base-containing aqueous solution. In this process, the quantity of KOH added, as a molar ratio of the base to the combined total of barium salt (barium hydroxide ($Ba(OH)_2 \cdot 8H_2O$) and iron (III) nitrate ($Fe(NO_3)_3 \cdot 9H_2O$)) in the starting material solution, and the base concentration in the base-containing aqueous solution, were set to yield the values indicated in Table 5.

(2) Preparation of Organic Modifier Solution

Oleic acid was dissolved in ethanol to prepare a modifier solution. The concentration of oleic acid in the solution that was prepared is given in Table 5.

(3) Synthesis Reaction of Hexagonal Ferrite

The starting material solution prepared in (1) above was introduced into liquid tank 4 of the manufacturing device shown in FIG. 3, the base-containing aqueous solution prepared in (1) above was introduced into liquid tank 5, and the organic modifier solution prepared in (2) above was introduced into liquid tank 3. SUS316BA tube was employed as the pipe in the manufacturing device.

High-temperature, high-pressure water was caused to flow through pipe 100 by heating with heater 4 while feeding the pure water that had been introduced into liquid tank 1 by means of pressure pump 5a. In this process, the temperature and the pressure were controlled so that the temperature of the high-temperature, high-pressure water in the liquid feed passage following passage by heating means 4c was 350° C. and the pressure was 30 MPa.

The starting material solution and the base-containing aqueous solution were heated by heating and pressurizing means 5d and 5e (high-pressure pumps) in a ratio based on volume of starting material solution: base-containing aqueous solution=50:50 and fed at a liquid temperature of 25° C. to pipes 103 and 104, respectively. After mixing in mixing element M4, the mixture was fed to pipe 105 and mixed with high-temperature, high-pressure water in mixing element M5.

The organic modifier solution was fed to pipe 102 at a liquid temperature of 25° C. by heating and pressurizing means 5c (high pressure pump) so that the ratio based on volume of (starting material solution+base-containing aqueous solution): organic modifier solution=40:60. In mixing element M6, it mixed with the mixed flow obtained by the above mixing in mixing element M5. Next, in reaction flow passage 6, ferromagnetic hexagonal ferrite particles (barium ferrite nanoparticles) were synthesized by heating and pressurizing for 20 seconds at 30 MPa at the temperature indicated in Table 5.

Following the synthesis of the barium ferrite nanoparticles, the liquid containing the barium ferrite nanoparticles was cooled by cold water in cooling element 7 and the particles were collected.

The particles that had been collected were washed with ethanol and the barium ferrite nanoparticles were then separated by centrifugation.

The ferromagnetic hexagonal ferrite powder obtained above was evaluated by the same methods as in Example 1-1 and the like.

4. Examples and Comparative Examples Relating to Magnetic Recording Media (Magnetic Tapes)

Examples 4-1 to 4-5 and Comparative Examples 4-1 to 4-3

With the exception that the ferromagnetic hexagonal ferrite powders prepared in Examples 3-1 to 3-5 and Comparative Examples 3-1 to 3-3 were employed, magnetic tapes were prepared in the same manner as in Example 2-1 and the like, and the magnetic tapes that were prepared were evaluated in the same manner as in Example 2-1 and the like. The results are given in Table 4.

Examples 6-1 to 6-4 and Comparative Examples 6-1 to 6-3

With the exception that the ferromagnetic hexagonal ferrite powders prepared in Examples 5-1 to 5-4 and Comparative Examples 5-1 to 5-3 were employed, magnetic tapes were prepared in the same manner as in Example 2-1 and the like, and the magnetic tapes that were prepared were evaluated in the same manner as in Example 2-1 and the like. The results are given in Table 6.

TABLE 3

| | Examples and Comparative Examples relating to ferromagnetic hexagonal ferrite powder | | | | | | | |
|---|---|---|---|---|---|---|---|---|
| | Ex. 3-1 | Ex. 3-2 | Ex. 3-3 | Ex. 3-4 | Ex. 3-5 | Comp. Ex. 3-1 | Comp. Ex. 3-2 | Comp. Ex. 3-3 |
| Proportion of ellipsoid particles satisfying relation (1) | 69% | 63% | 60% | 58% | 59% | 43% | 3% | 69% |
| Proportion of spherical particles satisfying relation (2) | 20% | 30% | 35% | 40% | 31% | 57% | 6% | 10% |

TABLE 3-continued

| | Examples and Comparative Examples relating to ferromagnetic hexagonal ferrite powder | | | | | | | |
|---|---|---|---|---|---|---|---|---|
| | Ex. 3-1 | Ex. 3-2 | Ex. 3-3 | Ex. 3-4 | Ex. 3-5 | Comp. Ex. 3-1 | Comp. Ex. 3-2 | Comp. Ex. 3-3 |
| Proportion of acicular particles satisfying relation (3) | 3% | 1% | 0% | 0% | 1% | 0% | 0% | 5% |
| Particles other than those satisfying relation (1), (2), (3) | 8% | 6% | 5% | 2% | 9% | 0% | 91% | 16% |
| Average major axis length | 18 nm | 16 nm | 15 nm | 11 nm | 17 nm | 12 nm | — | 28 nm |
| Concentration of base in precursor solution | 0.20M | 0.20M | 0.20M | 0.20M | 0.15M | 0.1M | 0.30M | 0.15M |
| Proportion of base relative to total of iron salt and divalent metal salt (molar ratio) | 4 | 4 | 4 | 4 | 3 | 2 | 6 | 4 |
| Concentration of oleic acid | 0.075M | 0.15M | 0.75M | 1.5M | 0.075M | 0.075M | 0.075M | — |
| Heating temperature within reaction flow passage | 400° C. | 400° C. | 400° C. | 400° C. | 400° C. | 400° C. | 400° C. | 400° C. |
| Shape of particle accounting for 50% or more | Ellipsoid particles | Ellipsoid particles | Ellipsoid particles | Ellipsoid particles | Ellipsoid particles | Spherical particles | Tabular particles | Ellipsoid particles |

TABLE 4

| | Examples and Comparative Examples relating to magnetic tape | | | | | | | |
|---|---|---|---|---|---|---|---|---|
| | Ex. 4-1 | Ex. 4-2 | Ex. 4-3 | Ex. 4-4 | Ex. 4-5 | Comp. Ex. 4-1 | Comp. Ex. 4-2 | Comp. Ex. 4-3 |
| Ferromagnetic powder | Ex. 3-1 | Ex. 3-2 | Ex. 3-3 | Ex. 3-4 | Ex. 3-5 | Comp. Ex. 3-1 | Comp. Ex. 3-2 | Comp. Ex. 3-3 |
| SNR (dB) | +0.4 | +0.7 | +0.6 | +0.5 | +0.6 | 0 | −0.5 | −0.3 |
| Coating durability | A | A | A | A | A | C | D | B |

TABLE 5

| | Examples and Comparative Examples relating to ferromagnetic hexagonal ferrite powder | | | | | | |
|---|---|---|---|---|---|---|---|
| | Ex. 5-1 | Ex. 5-2 | Ex. 5-3 | Ex. 5-4 | Comp. Ex. 5-1 | Comp. Ex. 5-2 | Comp. Ex. 5-3 |
| Proportion of ellipsoid particles satisfying relation (1) | 60% | 63% | 68% | 57% | 45% | 3% | 70% |
| Proportion of spherical particles satisfying relation (2) | 31% | 29% | 25% | 41% | 53% | 2% | 15% |
| Proportion of acicular particles satisfying relation (3) | 1% | 3% | 4% | 1% | 2% | 0% | 5% |
| Tabular particles | 8% | 5% | 3% | 1% | 0% | 85% | 10% |
| Average major axis length | 17 nm | 14 nm | 13 nm | 11 nm | 15 nm | — | 32 nm |
| KOH concentration in basic aqueous solution | 0.20M | 0.18M | 0.16M | 0.18M | 0.13M | 0.40M | 0.16M |
| Proportion of base relative to total of iron salt and divalent metal salt (molar ratio) | 2.7 | 2.4 | 2.1 | 2.4 | 1.3 | 5.3 | 2.1 |
| Concentration of oleic acid | 0.075M | 0.075M | 0.075M | 0.45M | 0.075M | 0.075M | — |
| Heating temperature within reaction flow passage | 380° C. | 380° C. | 380° C. | 380° C. | 380° C. | 380° C. | 380° C. |
| Shape of particle accounting for 50% or more | Ellipsoid particles | Ellipsoid particles | Ellipsoid particles | Ellipsoid particles | Spherical particles | Tabular particles | Ellipsoid particles |

TABLE 6

Examples and Comparative Examples relating to magnetic tape

|  | Ex. 6-1 | Ex. 6-2 | Ex. 6-3 | Ex. 6-4 | Comp. Ex. 6-1 | Comp. Ex. 6-2 | Comp. Ex. 6-3 |
|---|---|---|---|---|---|---|---|
| Ferromagnetic powder | Ex. 5-1 | Ex. 5-2 | Ex. 5-3 | Ex. 5-4 | Comp. Ex. 5-1 | Comp. Ex. 5-2 | Comp. Ex. 5-3 |
| SNR (dB) | +0.5 | +0.6 | +0.8 | +0.3 | 0 | −0.6 | −0.2 |
| Coating durability | A | A | A | A | C | D | B |

Evaluation of Results

Based on the above results, use of the ferromagnetic hexagonal ferrite powder obtained by the manufacturing method according to an aspect of the present invention as ferromagnetic powder in the magnetic layer was determined to yield a magnetic recording medium exhibiting good electromagnetic characteristics (a high SNR) and coating durability.

When 500 randomly selected particles were extracted from the magnetic layer by the above-described method, the shape of the particles was observed, and the average particle size was measured for the magnetic tapes of Examples and Comparative Examples, the same values as those presented in Tables 1, 3, and 5 were obtained.

An aspect of the present invention is useful in the field of manufacturing high-capacity magnetic recording media such as backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing ferromagnetic hexagonal ferrite powder, which comprises:
    mixing an iron salt and a divalent metal salt in a base-containing water-based solution to prepare a hexagonal ferrite precursor; and
    continuously feeding a water-based mixed flow containing an organic modifier and the hexagonal ferrite precursor that has been prepared to a reaction flow passage while heating to equal to or higher than 300° C. and applying a pressure of equal to or higher than 20 MPa to convert the hexagonal ferrite precursor to hexagonal ferrite particles, to provide ferromagnetic hexagonal ferrite powder, the average particle size of which is equal to or less than 20 nm, and which comprises, on a particle number basis, equal to or more than 50% of ellipsoid hexagonal ferrite powders satisfying relation (1):

$$1.2 < \text{major axis length/minor axis length} < 2.0 \quad \ldots \quad (1).$$

2. The method of manufacturing ferromagnetic hexagonal ferrite powder according to claim 1, wherein an average particle size of the ferromagnetic hexagonal ferrite powder provided ranges from 5 nm to 20 nm.

3. The method of manufacturing ferromagnetic hexagonal ferrite powder according to claim 1, wherein the ferromagnetic hexagonal ferrite powder provided comprises, on a particle number basis, equal to or less than 45% of spherical hexagonal ferrite particles satisfying relation (2):

$$\text{major axis length/minor axis length} \leq 1.2 \quad \ldots \quad (2).$$

4. The method of manufacturing ferromagnetic hexagonal ferrite powder according to claim 1, wherein the ferromagnetic hexagonal ferrite powder provided comprises, on a particle number basis, equal to or less than 5% of acicular hexagonal ferrite particles satisfying relation (3):

$$\text{major axis length/minor axis length} \geq 2.0 \quad \ldots \quad (3).$$

5. The method of manufacturing ferromagnetic hexagonal ferrite powder according to claim 1, wherein the water-based mixed flow that is continuously fed into a reaction flow passage is a water-based mixed flow that is obtained by:
    mixing a water-based solution comprising the hexagonal ferrite precursor that has been prepared with a solution comprising an organic modifier and then
    adding the solution that has been obtained by the mixing to a liquid feed passage into which water that has been heated and pressurized is being continuously fed.

6. The method of manufacturing ferromagnetic hexagonal ferrite powder according to claim 1, wherein the water-based mixed flow that is continuously fed into a reaction flow passage is a water-based mixed flow that is obtained by:
    sequentially adding a water-based solution comprising the hexagonal ferrite precursor that has been prepared and a solution comprising an organic modifier to a liquid feed passage to which water that has been heated and pressurized is being continuously fed.

7. The method of manufacturing ferromagnetic hexagonal ferrite powder according to claim 1, which comprises preparing the water-based solution comprising the hexagonal ferrite precursor by causing a liquid feed passage to which a solution comprising a divalent metal salt and an iron salt is being fed to converge with a liquid feed passage to which a base-containing water-based solution is being fed to mix the two solutions.

8. The method of manufacturing ferromagnetic hexagonal ferrite powder according to claim 1, wherein the organic modifier is selected from the group consisting of carboxylic acids and salts of carboxylic acids.

9. The method of manufacturing ferromagnetic hexagonal ferrite powder according to claim 1, wherein the base-containing water-based solution is a water-based solution comprising a base in a quantity such that a molar ratio of the base to a combined quantity of the iron salt and the divalent metal salt is equal to or less than 5.

* * * * *